United States Patent
Tang

(10) Patent No.: US 9,513,726 B2
(45) Date of Patent: Dec. 6, 2016

(54) ILLUMINATION BASED USER MOTION TRACKING DEVICES AND METHODS

(75) Inventor: Terence Tang, Singapore (SG)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 134 days.

(21) Appl. No.: 13/994,748

(22) PCT Filed: Dec. 15, 2010

(86) PCT No.: PCT/SG2010/000468
§ 371 (c)(1),
(2), (4) Date: Jan. 30, 2014

(87) PCT Pub. No.: WO2012/082070
PCT Pub. Date: Jun. 21, 2012

(65) Prior Publication Data
US 2015/0002399 A1    Jan. 1, 2015

(51) Int. Cl.
G06F 3/039    (2013.01)
G06F 3/03    (2006.01)
G06F 3/0354    (2013.01)
G06F 3/041    (2006.01)

(52) U.S. Cl.
CPC .......... G06F 3/0395 (2013.01); G06F 3/0317 (2013.01); G06F 3/03543 (2013.01); G06F 3/03545 (2013.01); G06F 3/03547 (2013.01); G06F 3/0412 (2013.01)

(58) Field of Classification Search
CPC ................. G06F 3/0354–3/0395; G06F 3/041
USPC ................................................ 345/156–184
See application file for complete search history.

(56) References Cited

U.S. PATENT DOCUMENTS 6,635,336 B1 * 10/2003 Chen .................... G06F 3/0395
                                                                248/346.01
7,249,431 B1 * 7/2007 Rose et al. ..................... 40/543
(Continued)

FOREIGN PATENT DOCUMENTS

CN         2812105 Y     8/2006
JP     2000-259344 A     9/2000
(Continued)

OTHER PUBLICATIONS

"International Search Report and Written Opinion dated Sep. 27, 2011," International Application No. PCT/SG2010/000468, 7 pages.
(Continued)

Primary Examiner — Stephen Sherman
(74) Attorney, Agent, or Firm — Polsinelli PC

(57) ABSTRACT

A device, for example a mouse pad, configured to illuminate, fluoresce, or glow depending upon user input or user motion. The pattern, format, shape, and/or direction of illumination by the mouse pad depend upon user-directed motion of an input source relative to the mouse pad. For example, the illumination pattern or profile of the mouse pad can depend on user-directed motion of an illumination source, for example a LED source carried by an optical mouse, relative to the mouse pad. The mouse pad includes a first layer that includes a first luminescent composition and a second layer that includes a second luminescent composition. The first luminescent composition and the second luminescent composition can have different luminescent properties or characteristics. The first luminescent composition and the second luminescent composition can be selected for establishing or providing the mouse pad with a desired, intended, or target set of illumination characteristics. The ratio of the first luminescent composition to the second luminescent composition can also be selected and/or varied to provide the mouse pad with a desired, intended, or target set of illumination characteristics.

20 Claims, 7 Drawing Sheets

(56) References Cited

U.S. PATENT DOCUMENTS

| | | | |
|---|---|---|---|
| 2002/0070351 A1* | 6/2002 | Yanagita et al. | 250/484.4 |
| 2004/0265546 A1* | 12/2004 | Brophy | 428/192 |
| 2005/0099366 A1* | 5/2005 | Hoelzemann et al. | 345/72 |
| 2005/0142371 A1* | 6/2005 | Swain | B32B 25/08 428/516 |

FOREIGN PATENT DOCUMENTS

| | | |
|---|---|---|
| JP | 3111263 U | 7/2005 |
| JP | 2006-155625 A | 6/2006 |
| JP | 2007-179295 A | 7/2007 |
| KR | 10-2005-0107654 A | 11/2005 |

OTHER PUBLICATIONS

First Office Action mailed Aug. 24, 2015; in Chinese patent application No. 201080071220.3.

English Abstract for CN281205Y; published Aug. 30, 2006 and retrieved Oct. 5, 2015.

* cited by examiner

ILLUMINATION BASED USER MOTION TRACKING DEVICES AND METHODS

TECHNICAL FIELD

The present disclosure relates generally to devices that are able to illuminate, luminesce, fluoresce, or glow depending upon user input, more specifically user motion. More particularly, the present disclosure relates to surfaces (e.g., mouse pads) that are associated with input devices (e.g., optical devices), wherein said surfaces are capable of illuminating, luminescing, fluorescing, glowing, or outputting light in a pattern, profile, shape, or form that is dependent upon user-directed motion or movement of the input devices.

BACKGROUND

Optical input devices, more particularly optical computer mice, have become increasingly popular in recent years. An optical mouse typically uses a light emitting diode (LED), which is positioned at an underside of the optical mouse, and an optical sensor to detect movement relative to a work surface or substrate, for instance a mouse pad.

Mouse pads are computer accessories that provide a suitable substrate or work surface for the operation or use of optical mice. Mouse pads often include one or more forms of decoration or artwork in order to enhance their visual appeal. It is very common to find mouse pads with prints, drawings, or photographs printed on an upper surface of the mouse pad (e.g., on top of a cushioning layer of the mouse pad). In addition, it is increasingly common to find textured mouse pads as well as mouse pads having molded or "holographic" decorations.

When incorporating aesthetic features or decorations to a mouse pad, there are practical considerations to note regarding the function of mouse pads. For example, a mouse pad must include a generally flat upper surface to provide a work surface or substrate that is suitable for the operation (e.g., movement) of the optical mice. In addition, mouse pads need to be relatively thin and lightweight. It is also desirable for mouse pads to remain stable and stationary when placed on a variety of work surfaces. Furthermore, it is often important that the manufacturing cost of mouse pads be kept low. Therefore, artistic efforts applied to mouse pads generally need to take into consideration such practical or functional aspects of mouse pads.

Recently, mouse pads (or mouse mats) that are able to glow or illuminate have been developed. For instance, glow mouse mats that include or incorporate light emitting diodes (LEDs) have been manufactured and sold by ClubberToys. Each glow mouse pad sold by ClubberToys incorporates a specific design that can be illuminated using said LEDs when the glow mouse pad is coupled to a computer that has been switched on. However, the design of each glow mouse pad by ClubberToys cannot be dynamically changed or modified during use of said glow mouse pad. In addition, the glow mouse pads by ClubberToys necessarily need to be coupled to a power source before illumination thereof.

Mouse pads that are capable of glowing in the dark have recently been developed. Specific glow in the dark designs, for example words, phrases, and/or pictures, can be printed onto a layer of said glow in the dark mouse pads using a glow in the dark powder or pigment. The glow in the dark mouse pads are then capable of luminescing or glowing in the dark with the exact glow in the dark design that has been printed thereonto subsequent exposure to an illumination source (or activating illumination). However, the glow in the dark design or pattern of a particular glow in the dark mouse pad is determined by the glow in the dark design that has be pre-printed onto a layer of said glow in the dark mouse pad. The glow in the dark design of existing glow in the dark mouse pads cannot be dynamically determined, altered, and/or modified during use of the mouse pad.

SUMMARY

In accordance with a first aspect of the present disclosure, there is disclosed an input system that includes a surface. The surface includes a first luminescent composition of a first set of luminescent properties and a second luminescent composition of a second set of luminescent properties. The first and second luminescent compositions establishing the surface with a resultant set of luminescent properties. Portions of the surface are able to illuminate with the resultant set of luminescent properties. A profile of the surface illumination corresponds to a motion profile of an input source relative to the surface.

In accordance with a second aspect of the present disclosure, there is disclosed a method for producing an input system. The method includes introducing a first luminescent composition of a first set of luminescent properties to a surface and introducing a second luminescent composition of a second set of luminescent properties to the surface. The first and second luminescent compositions provide the surface with a resultant set of luminescent properties. Portions of the surface are able to illuminate with the resultant set of luminescent properties subsequent receipt of an input provided by an input source. A profile of surface illumination corresponds to a motion profile of the input source relative to the surface.

In accordance with a third aspect of the present disclosure, there is disclosed a method for generating user-directed illumination. The method includes providing a device that includes a first luminescent composition of a first set of luminescent properties and a second luminescent composition of a second set of luminescent properties. The first and second luminescent compositions provide the device with a resultant set of luminescent properties. The method also includes generating device illumination in response to user motion of an input source relative to the device. The device illumination is of the resultant set of luminescent properties and profile of the device illumination corresponds to motion profile of the input source relative to the device.

BRIEF DESCRIPTION OF THE DRAWINGS

Embodiments of the present disclosure are described hereinafter with reference to the drawings, in which.

Figure 1A:
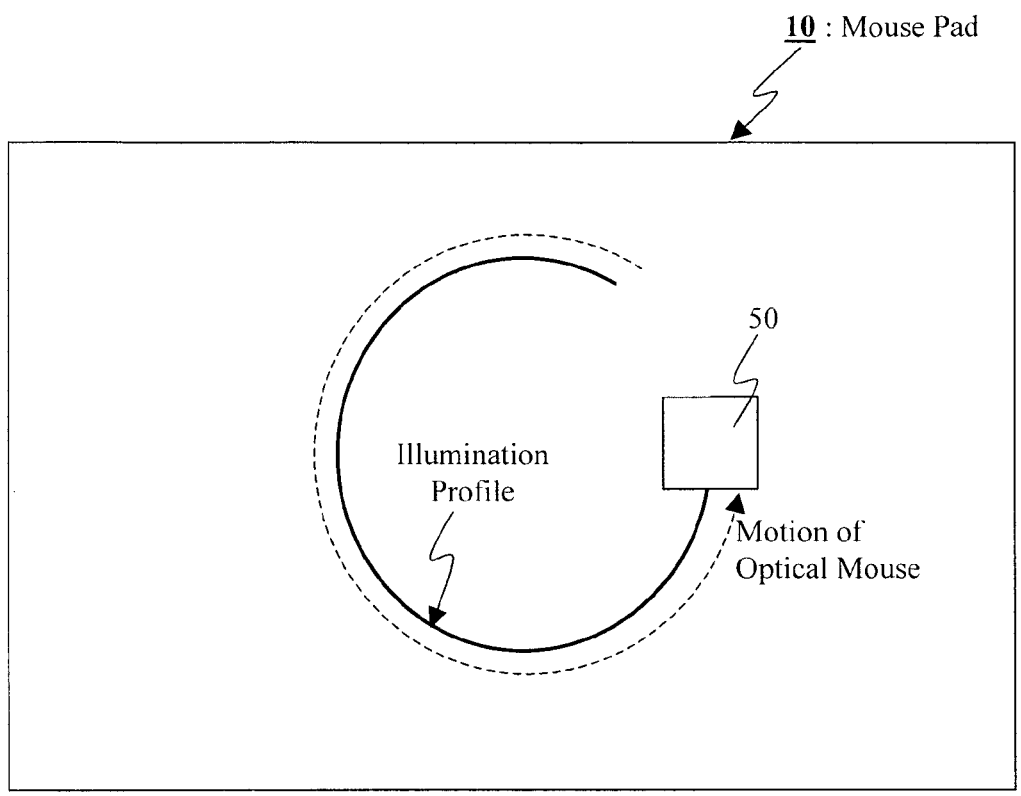
FIG. 1a shows a top view of a mouse pad displaying an illumination profile that corresponds to movement or motion profile of an optical mouse relative to the mouse pad according to particular embodiments of the present disclosure.

Table 1 shows the brightness or intensity values of ultra blue glow in the dark powder and regular green glow in the dark powder relative to the time lapsed from activation of said glow in the dark powders; and Table 2 show the brightness or intensity values of pure blue glow in the dark powder and economy green glow in the dark powder relative to the time lapsed from activation of said glow in the dark powders

DETAILED DESCRIPTION

Embodiments of the present disclosure relate to illumination or luminescence based user motion tracking, following, or trailing devices, apparatuses, systems, methods, processes, and techniques. Many embodiments relate to devices, or device surfaces and/or layers, which are capable of illuminating, luminescing, fluorescing, glowing, or outputting light depending or based upon user motion or movement. The devices, or device surfaces and/or layers, are capable of illuminating, luminescing, fluorescing, glowing, and/or outputting light in response to received or captured input, for example received or captured illumination (i.e., light or optical energy) that is supplied or emitted from an illumination or light source. Other forms of inputs also include touch-based, proximity-based, and pressure-based inputs. The pattern, profile, shape, direction, and/or form of the illumination, luminescence, fluorescence, or glow that is generated, produced, and/or displayed by the device or device surface is dependent upon user-controlled or user-directed motion, movement, or position of an input device, module, or apparatus, relative to the device. In multiple embodiments, the pattern, profile, shape, direction, and/or form of the illumination, luminescence, fluorescence, or glow that is generated, produced, and/or displayed by the device or device surface is dependent upon, or corresponds to, movement pattern or profile of an optical input device or illumination source (e.g., an LED carried by a computer input device such as an optical mouse) relative to the device or device surface (e.g., mouse pad). In multiple embodiments, light or optical energy supplied or emitted by the illumination source is sufficient to effectuate the generation of device or device surface illumination, luminescence, fluorescence, or glow.

The devices, or device surfaces and/or layers, associated with multiple embodiments of the present disclosure can correspond to mouse pads, display surfaces or screens, projection screens, support surfaces or substrates, and/or like surfaces. In most embodiments, the devices, or device surfaces and/or layers, include at least two different luminescent compositions, pigments, paints, powders, or chemicals (hereinafter referred to as luminescent compositions), wherein each of the at least two different luminescent compositions has a different set of luminescent properties. For instance, the device can include a first luminescent composition of a first set of luminescent properties and a second luminescent composition of a second set of luminescent properties. The inclusion of at least two different luminescent compositions, for example the first luminescent composition and the second luminescent composition, provides or establishes the device with a resultant or an overall set of illumination properties. This resultant set of illumination properties can be different from either of the first set of luminescent properties (i.e., of the first luminescent composition) or the second set of luminescent properties (i.e., of the second luminescent composition).

For purposes of the present disclosure, luminescent or illumination properties can include, but are not limited to, (a) light exposure duration prior to illumination (or rate of light absorption); (b) color or wavelength of illumination or luminescence; (c) brightness or intensity of illumination or luminescence; (d) total duration of illumination or luminescence (or illumination persistence); and (e) rate of disappearance, fade, or decay of illumination or luminescence.

Each of the at least two different luminescent compositions (e.g., the first luminescent composition and the second luminescent composition) can be selected and/or varied for selecting and/or varying the resultant or overall set of luminescent properties of the device. In many embodiments, the relative quantities and/or concentrations of each of the at least two different luminescent compositions (e.g., the first luminescent composition and the second luminescent composition) can be selected and/or varied as desired, for instance depending on a desired or target resultant set of luminescent properties of the device. For example, a luminescent composition having a higher brightness rating can be selected as one of the first or second luminescent composition for increasing the resultant brightness of luminescence of the device. Additionally, or alternatively, a luminescent composition with a long, or significantly long, illumination persistence (or illumination persistence duration) can be selected as one of the first or second luminescent composition for increasing the illumination persistence duration associated with the device.

The at least two different luminescent compositions, for example the first luminescent composition and the second luminescent composition, can be disposed, positioned, arranged, isolated, or found at different or distinct layers of the device, for example a first layer and a second layer, respectively, of the device. In multiple embodiments, the first layer (which includes the first luminescent composition) and the second layer (which includes the second luminescent composition) are disposed adjacent, next, or proximal, to each other. In several embodiments, the first layer is positioned or disposed closer to a surface of the device while the second layer is positioned or disposed further from said surface of the device. In particular embodiments wherein the device is, or includes, a mouse pad, the first layer can be disposed closer to the upper surface of the mouse pad that receives, couples to, or is proximal to, an optical mouse during normal operation of the mouse pad and optical mouse, and the second layer can be disposed beneath or underneath the first layer. In addition, distribution of the first luminescent composition and/or the second luminescent composition across the first layer and/or the second layer respectively can be selected and varied as desired.

Devices or apparatuses, or device surfaces and/or layers (e.g., mouse pad surfaces and/or layers), of embodiments of the present disclosure are capable of illuminating, luminescing, glowing, or outputting light subsequent or upon receiving, sensing, or capturing one or more types of inputs. The input can include optical inputs, touch-based inputs, proximity-based inputs, and pressure-based inputs. In many embodiments, the devices, or device surfaces and/or layers (e.g., mouse pad surfaces and/or layers) of embodiments of the present disclosure are capable of illuminating, luminescing, glowing, or outputting light subsequent to or upon receipt, capture, or absorption of illumination (i.e., light or optical energy) that is supplied or provided by an illumination or light source (e.g., a light emitting diode (LED) carried by an optical mouse). In multiple embodiments, the device or device surface illuminates, luminesces, or glows with the resultant set of luminescent properties that is generated, established, or provided by way of the at least two different luminescent compositions present, included, or incorporated in the device or device surface, for instance at different layers of the device or device surface. In addition, the pattern, profile, shape, direction, and/or form of illumination, luminescence, or glow generated, produced, and/or displayed by the device or device surface is dependent upon user-directed motion, movement, or position of the input device (e.g., illumination source such as an optical mouse) relative to the device or device surface.

Representative aspects of luminescence or illumination based user motion tracking devices, apparatuses, methods, processes, and/or techniques are described in detail hereinafter with reference to FIG. 1 to FIG. 5, in which like or analogous elements or process portions are shown numbered with like or analogous reference numerals. Relative to descriptive material corresponding to one or more of FIG. 1 to FIG. 5, the recitation of a given reference numeral can indicate simultaneous consideration of a FIG. in which such reference numeral was previously shown. The embodiments provided by the present disclosure are not precluded from applications in which particular fundamental structural and/or operational principles, properties, or characteristics present among the various embodiments described herein are desired.

Aspects of Representative Device Embodiments

Figure 1B:
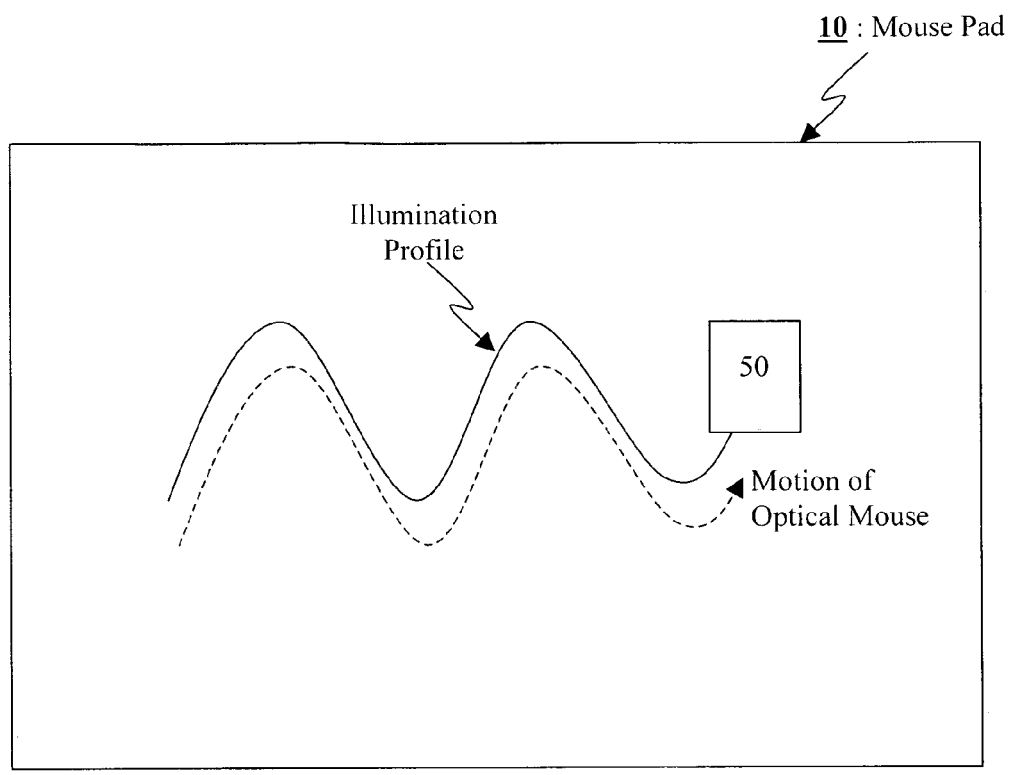
FIG. 1b shows a top view of a mouse pad displaying a different illumination profile to that shown in FIG. 1a, the illumination profile of FIG. 1b corresponding to a different movement or motion profile of an optical mouse relative to the mouse pad, according to particular embodiments of the present disclosure.
Figure 1C:
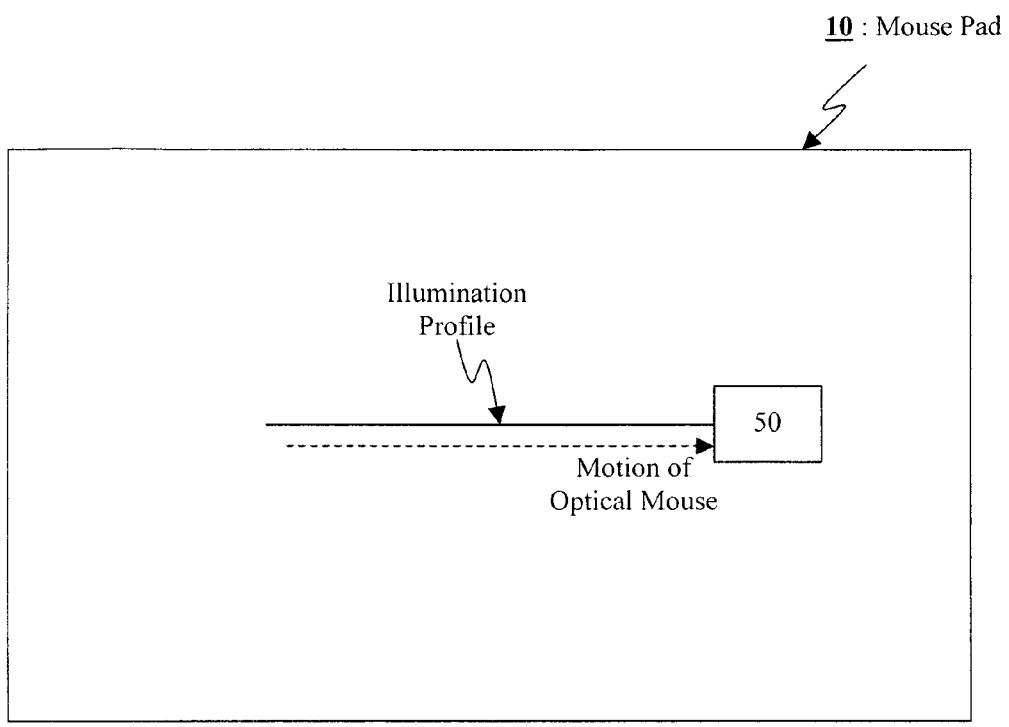
FIG. 1c shows a top view of a mouse pad displaying yet another different illumination profile to that of FIG. 1a and FIG. 1b, the illumination profile of FIG. 1c corresponding to a different movement or motion profile of an optical mouse relative to the mouse pad, according to particular embodiments of the present disclosure.
Figure 2:
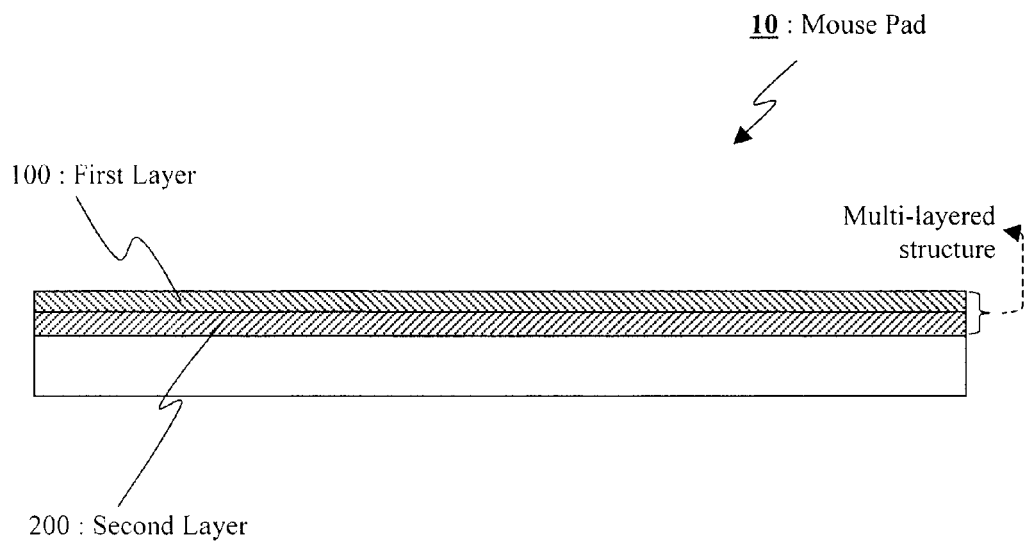
FIG. 2 shows a cross-sectional view of mouse pads of FIG. 1a to FIG. 1c, the mouse pad including a first layer that includes a first luminescent composition and a second layer that includes a second luminescent composition according to various embodiments of the present disclosure.

FIG. 1a to FIG. 1c provide a top view of a device or apparatus, that is or includes a mouse pad 10 configured for displaying an illumination profile or pattern that is generated, produced, or activated by a user-controlled or user-directed illumination source, more specifically an optical mouse 50. FIG. 2 shows a cross-sectional view of the mouse pad 10 shown in FIG. 1a to FIG. 1c, the mouse pad 10 including multi-layered structure (e.g., a bi-layered structure) that includes a first layer 100 that includes or carries a first luminescent composition and a second layer 200 that includes or carries a second luminescent composition.

The following description of various embodiments of the present disclosure is directed at to mouse pads 10 for purpose of simplicity and to aid understanding. However, other devices or apparatuses, or device surfaces and/or layers, such as touch screens or touch pads, projection screens, support surfaces or substrates, and/or display surfaces, which share similar, or substantially similar, functional and/or structural characteristic(s) to the mouse pads 10 are also included within the scope of the present disclosure. Particular aspects of input systems including such alternative devices, or device surfaces and/or layers, are described in further detail below.

Aspects of the Mouse Pad 10

In many embodiments, a mouse pad 10 in accordance with various embodiments of the present disclosure operates, functions, or is used together with a computer mouse, more specifically an optical mouse 50.

Optical Mice

An optical mouse generally uses a light-emitting diode (LED) or laser and photodiodes to detect movement relative to an underlying surface, for instance a mouse pad. Generally, the LED of the optical mouse supplies or emits light, which bounces or is reflected off the surface (e.g., mouse pad) onto a sensor, for example a complimentary metal-oxide semiconductor (CMOS) sensor, carried by the optical mouse. The sensor sends captured light (or images) to a digital signal processor (DSP) for analysis. The DSP is able to detect patterns in the images and compare relative patterns in consecutive images. Based upon changes in the patterns over a sequence of images, the DSP can determine the motion or movement of the optical mouse relative to the surface (e.g., mouse pad). The motion of the optical mouse, or the corresponding coordinates associated with said motion, is sent to a computer for directing a cursor on the computer's screen. The color of an optical mouse's LED can vary. Generally, red or blue LEDs are more commonly used. The optical mouse 50 can be considered to be, or alternatively to include or carry, a light or illumination source. In many embodiments, the light source includes or is a blue LED that is positioned at an underside of the optical mouse 50. Motion, movement, or position of the optical mouse 50 relative to the mouse pad 10 can be controlled or directed by a user. Correspondingly, the motion, movement, or position of the light source (e.g., the blue LED) relative to the mouse pad 10 can be controlled or directed by the user.

In most embodiments of the present disclosure, the mouse pad 10 is capable of illuminating, luminescing, fluorescing, or glowing depending upon user motion or movement, more specifically user-directed motion, movement, or position of the optical mouse 50 (and hence light source) relative to the mouse pad 10. In many embodiments, the pattern, profile, format, form, or direction of mouse pad illumination, luminescence, fluorescence, or glow depends upon user motion or movement, more specifically user-directed motion, movement, or position of the optical mouse 50 (and hence light source) relative to the mouse pad 10.

Light is a form of energy. Generally, the emission of light can be caused by two processes, namely incandescence and luminescence. Luminescence is generally regarded as light that is produced or occurs at a normal or low temperature (i.e., a form of cold body radiation) and incandescence is generally acknowledged as light from heat energy. For purposes of the present disclosure, the term "illumination", "luminescence", "fluorescence", and "glow" each refers to the quality or state of having, emitting, or giving off light. In addition, the terms "illumination", "luminescence", "fluorescence", and "glow" can be used interchangeably.

The illumination or luminescence produced, generated, and/or displayed by the mouse pad 10 can trail, follow, or mirror the motion or movement of the optical mouse 50 relative to the mouse pad 10. Accordingly, the profile or pattern of the mouse pad illumination can correspond to, follow, trail, or mirror the profile or pattern of optical mouse movement relative to the mouse pad 10. Illumination by the mouse pad 10 can be generated and/or displayed in response to, or in direct response to, movement of the optical mouse 50 relative to the mouse pad 10.

As shown in FIG. 1a, where the user directs the optical mouse 50 to move in profile or pattern, more specifically a circle, relative to the mouse pad 10, a corresponding illumination profile or pattern, more specifically a circular illumination profile or pattern is produced, generated, and/or displayed by portions of the mouse pad 10. Alternatively, for example as shown in FIG. 1b, where the user directs the optical mouse 50 in a zig-zag profile or pattern relative to the mouse pad 10, a corresponding zig-zag illumination profile or pattern can hence be produced, generated, and/or displaced by portions of the mouse pad 10. In addition, where the user directs the optical mouse 50 in a straight line relative to the mouse pad 10 as shown in FIG. 1c, a corresponding straight line of illumination can be produced, generated, and/or displaced by portions of the mouse pad 10.

In many embodiments of the present disclosure, the mouse pad 10 includes the multi-layered structure (e.g., the bi-layered structure that includes the first layer 100 and the second layer 200). Each layer can include a different luminescent composition. Accordingly, in multiple embodiments, the mouse pad 10 includes at least two different luminescent compositions for facilitating, enabling, supporting, or effectuating mouse pad illumination.

Luminescent Compositions

There are several different luminescent compositions known in the art. In multiple embodiments of the present disclosure, each luminescent composition that is included, incorporated, or present in the mouse pad 10 includes glow in the dark powder.

Glow in the dark powder, also known as photo luminous glow pigment or powder, functions or works by absorbing and releasing light energy in a continuous cycle. More particularly, glow in the dark powder functions by absorbing light energy in the presence of a light energy or illumination source and thereafter releasing light energy in the subsequent absence or removal of said light energy source. Glow in the dark powder can be re-charged and re-used many times by re-exposing said glow in the dark powder to a same or different light source. Glow in the dark powder is commonly used as a raw material in the production or manufacture of various luminescent compositions and/or glow in the dark products.

Glow in the dark powders contain phosphors, which are substances that radiate visible light after being activated or excited. Glow in the dark powders generally have a number of different or separate luminescent characteristics or properties, for example (a) type of energy required to energize or activate them; (b) amount of energy required to energize or activate them (or exposure duration prior to illumination); (c) the color or wavelength of illumination that they produce, generate, or emit; (d) intensity or brightness of glow or illumination; (e) persistence of glow (or total length of time the activated glow in the dark powder illuminates); and (f) rate of disappearance, decay, or fade of illumination. Two common phosphors are zinc sulfide and strontium aluminate. In addition, many glow in the dark powders or pigments, for instance the different glow in the dark powders or pigments manufactured and sold by GlowInc., are made from alkaline rare earth metal silicate-aluminate oxide europium doped.

Strontium aluminate (SRA, SrAl, $SrAl_2O_4$) is frequently used for producing (i.e., is a common constituent of) glow in the dark powder. Strontium aluminate is a solid odorless nonflammable pale yellow powder that is denser than water as well as chemically and biologically inert. When strontium aluminate is activated with a suitable dopant, for example europium, it can have the chemical formula $SrAlO_3Eu$ and can act as a photoluminescent phosphor. Typically, strontium aluminate phosphors produce green and aqua hues, where green gives or provides the highest brightness and aqua gives or provides the longest glow time. The excitation wavelengths for strontium aluminate range from 200 nm to 450 nm. The green formulation of strontium aluminate emits at 520 nm, the blue-green formulation of strontium aluminate emits at 505 nm, and the blue formulation of strontium aluminate emits at 490 nm. Generally, the glow or illumination intensity or brightness of strontium aluminate depends on the particle size wherein bigger particles of strontium aluminate produce a brighter glow or illumination.

In most embodiments of the present disclosure, the mouse pad 10 includes a multi-layered (e.g., bi-layered) structure. In many embodiments, the mouse pad 10 includes at least two layers, portions, or segments, for example, the first layer 100 and the second layer 200. In many embodiments, the first layer 100 includes or carries the first luminescent composition and the second layer 200 includes or carries the second luminescent composition. The first luminescent composition is of, or has, a first set of luminescent properties or characteristics and the second luminescent composition is of, or has, a second set of luminescent properties or characteristics.

The following description of particular embodiments of the present disclosure relate to mouse pads 10 including two layers (e.g., the first and second layers 100, 200), each layer including or associated with a corresponding luminescent composition (e.g., the first and second luminescent composition). However, it will be understood that mouse pads including more than two layers (e.g., three, four, or more layers), each of the more than two layers including a different luminescent composition with a different set of luminescent properties, are also included within the scope of the present disclosure. For example, a mouse pad including four layers of different luminescent compositions, for example a layer of red glow in the dark powder (200%), a layer of orange glow in the dark powder (180%), a layer of blue glow in the dark powder (150%), and a layer of green glow in the dark powder (15%-20%), is included within the scope of the present disclosure. Increasing the number of layers of different luminescent compositions can produce a multi-colored illumination trail (or glow trail).

Each of the first luminescent composition and the second luminescent composition can be selected and/or varied to correspondingly select and/or vary the resultant set of illumination properties of the mouse pad 10. Each of the first luminescent composition and the second luminescent composition contributes to, affects, influences, and/or helps to determine the resultant set of illumination properties of the mouse pad 10. In multiple embodiments, the first luminescent composition and the second luminescent composition of the mouse pad 10 include or have a different set of luminescent properties.

By adjusting the type, grade, properties, distribution, and/or ratio or relative percentages of quantity and/or concentration of the first luminescent composition to the second luminescent composition present, incorporated, or included in the mouse pad 10, the resultant or overall set of illumination properties of the mouse pad 10 can correspondingly be selected, adjusted, and/or varied.

Multiple embodiments of the present disclosure relate to mouse pads 10 that are capable of producing, generating, or displaying illumination with a profile or pattern that corresponds to the movement profile of an optical mouse 50. The illumination profile that is generated or displayed by the mouse pad 10 in response (e.g., direct response) to movement of the optical mouse 50 relative to the mouse pad 10 can be referred to as a glow trail or an illumination trail of the optical mouse 50. The glow trail follows the movement of the optical mouse 50 relative to the mouse pad 10. In many embodiments, the glow trail of the mouse pad 10 corresponds to portions of the mouse pad 10 that have been exposed to light (i.e., an illumination source). In several embodiments, the optical or light energy that is supplied or emitted by the optical mouse 50 is sufficient to generate mouse pad illumination.

The speed at which the glow trail is produced and/or displayed, the color of the glow trail, the intensity or brightness of the glow trail, the illumination persistence duration of the glow trail, and/or the rate of disappearance or decay of the glow trail can be determined by the luminescent properties of the first luminescent composition and/or the second luminescent composition of the mouse pad 10. In addition, the speed at which the glow trail is produced and/or displayed, the color of the glow trail, the intensity or brightness of the glow trail, the illumination persistence duration of the glow trail, and/or the rate of disappearance or decay of the glow trail can be determined by the ratio of the quantity of the first luminescent composition to the quantity of the second luminescent composition of the mouse pad 10.

In multiple embodiments, each of the first luminescent composition and the second luminescent composition is selected and/or varied for establishing or providing a desired or target set of luminescent properties for the mouse pad 10. In addition, the ratio or relative quantity of the first luminescent composition to the second luminescent composition can be selected and/or varied to establish a desired or target set of luminescent properties for the mouse pad 10.

For instance, at least one of the first luminescent composition and the second luminescent composition can be selected such that mouse pad illumination (or glow trail) can be produced quickly or substantially quickly (e.g., nearly immediately or within a small or very small time interval) upon exposure to a light source (e.g., an optical mouse). Furthermore, at least one of the first luminescent composition and the second luminescent composition can be selected for increasing the intensity or brightness of mouse pad illumination.

In multiple embodiments, at least one of the first luminescent composition and the second luminescent composition can be selected for establishing a desired or target illumination persistence duration for the mouse pad illumination and/or rate of decay of mouse pad illumination. For instance, at least one of the first luminescent composition and the second luminescent composition can be selected to enable the mouse pad illumination (or glow trail) to persist for an intended or target time interval, for example between approximately 1 second and 15 seconds, or more specifically between approximately 2 seconds and 5 seconds.

The ratio or relative quantity of the first luminescent composition to the second luminescent composition of the mouse pad 10 can also be selected and/or varied in a manner that helps to establish a desired or target illumination persistence duration for the mouse pad illumination and/or rate of decay of mouse pad illumination. For instance, the ratio of the first luminescent composition to the second luminescent composition of a mouse pad 10 can be between approximately 4:1 and 12:1, and in particular embodiments between approximately 7:1 and 9:1, to establish an illumination persistence duration of between approximately 1 second and 15 seconds, or more specifically between approximately 2 seconds and 5 seconds.

Aspects of Systems Including Devices or Device Surfaces and/or Layers of Particular Embodiments of the Present Disclosure The present disclosure also relate to systems that include or incorporate devices, or device surfaces and/or layers, provided by various embodiments of the present disclosure, as well as an input source, device, module, or apparatus. For example, the system of some embodiments includes the mouse pad 10 and the optical mouse 50. The mouse pad 10, or portions of the mouse pad 10, illuminates in response to illumination (i.e., light or optical energy) supplied or emitted by the optical mouse 50. In multiple embodiments, the light energy supplied by the optical mouse 50 is sufficient to effectuate generation of mouse pad illumination. The pattern or profile of mouse pad illumination corresponds to the profile or pattern of user-controlled or user-directed movement of the optical mouse 50 relative to the mouse pad 10.

In certain embodiments, the device, or device surface or layer, is carried by a touchpad or a tablet (e.g., such as an optical sensor LCD pad or surface produced by Sharp Corporation, Osaka, Japan) that includes the multi-layer structure (e.g., having a first layer 100 and a second layer 200) in a manner identical, essentially identical, or analogous to that described above in association with the mouse pad 10. Various aspects of such types of touchpads, as well as methods and/or techniques for producing or assembling such touchpads, are described in United States patent applications US 2007/0152977 A1 and US 2008/0272927 A1, which are incorporated herein by reference. In various embodiments, the multi-layered structure, more specifically the first and second layers 100, 200 including the first and second luminescent compositions respectively, are incorporated or included into the touchpad or tablet. Alternatively, the multi-layered structure, more specifically the first and second layers 100, 200 including the first and second luminescent compositions respectively as provided by embodiments of the present disclosure, can be coupled to, or assembled or laid on top of, a surface (e.g., a top surface) of a touchpad disclosed in either US 2007/0152977 A1 or US 2008/0272927 A1.

A system, apparatus, or device, for example a touch-sensitive surface or touchpad, in accordance with various embodiments of the present disclosure can illuminate in response to illumination (i.e., light or optical energy) supplied or emitted by an illumination source. The touch-sensitive surface or touchpad can carry the device or device surface provided by various embodiments of the present disclosure. Portions or areas of the illumination source can supply or emit light in response to user-directed or use-controlled movement of an input source relative to the touch-sensitive surface. Light emitted by the illumination source is captured or received by the device or device surface carried by the touch-sensitive screen to thereby enable generation or production of an illumination or glow trail by the device or device surface (i.e., to effectuate device or device surface illumination). The profile or pattern of the illumination trail of the device or device surface can correspond to the movement profile or pattern of the input source relative to the touch-sensitive surface. The input source can be for instance a portion of the user's body (e.g., finger) or a stylus.

Some embodiments of the present disclosure relate to systems that include a touch-sensitive surface or touch pad that carries or includes the device or device surface provided by particular embodiments where the touch-sensitive surface or touch pad need not include its own illumination source. The device or device surface can illuminate in response to an input source, for example an illumination source, that is external to the touch-sensitive surface or touchpad. The illumination source can be a light pen, a stylus carrying or adapted to carry an LED (e.g., at a tip or end of the stylus), or an optical pointer. The illumination source could alternatively be a user wearable light source, such as an LED carried by or attachable to a user's finger. A profile or pattern of illumination generated and emitted by the device surface carried by the touch-sensitive surface can correspond, or substantially correspond, to user-controlled or user-directed movement profile or pattern of the illumination source relative to the device surface carried by the touch-sensitive surface.

It is also understood that various structural and/or functional characteristics of the mouse pad 10 described above can also be incorporated or included in, or used with, a system or device in accordance with various embodiments of the present disclosure.

Figure 3:
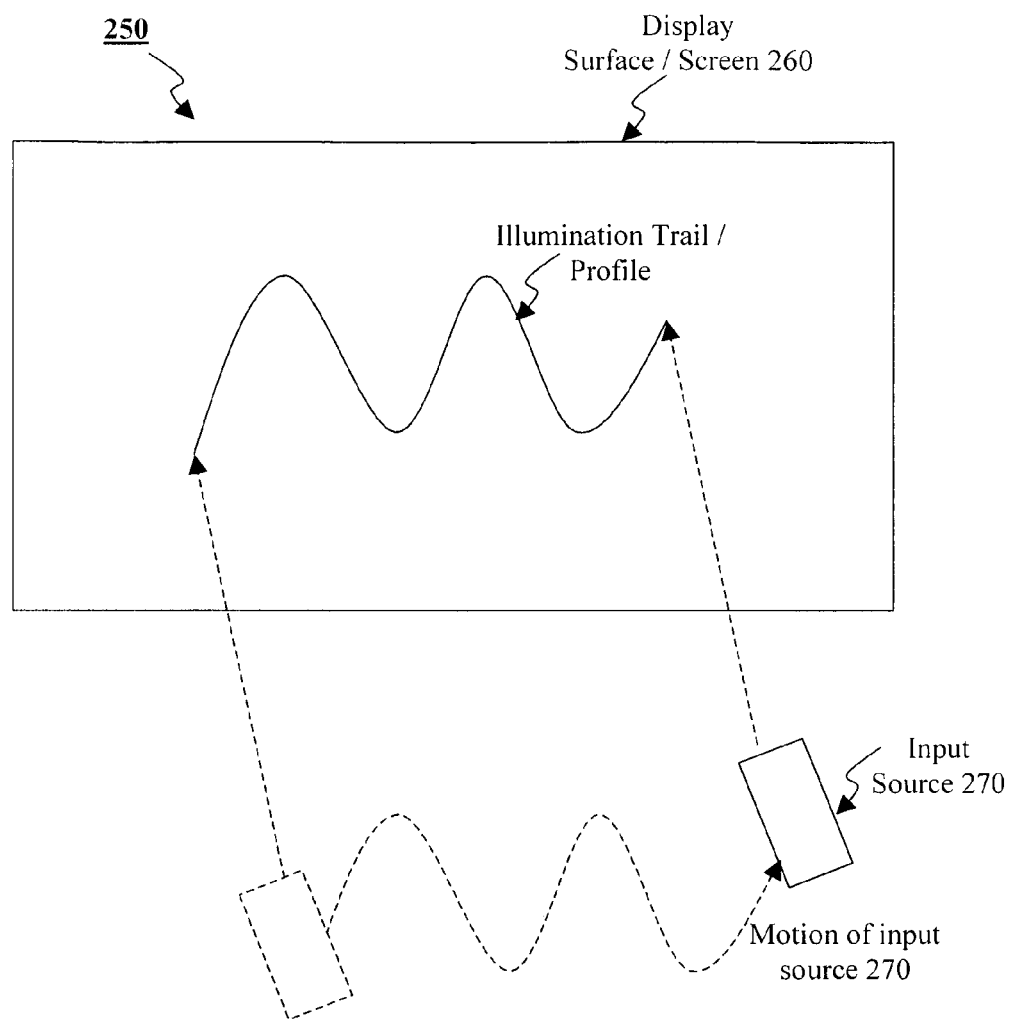
FIG. 3 shows an illumination trail or profile displayed or output on a display surface in response to input provided by an input source according to particular embodiments of the present disclosure.

FIG. 3 shows a system 250 including a surface or screen 260 (e.g., a display surface or screen 260) that can illuminate in response to, or depending upon, receipt or capture of a user-directed input provided by an input source, device, apparatus, or module 270.

In several embodiments, for instance as shown in FIG. 3, the input device 270 is a light pen, an optical or laser pointer, a stylus, or a game controller (e.g., a handheld wireless game controller) that is adapted to emit light. The display surface 260 includes a device or device surface in accordance with an embodiment of the present disclosure. It is understood that various structural and/or functional characteristics of the mouse pad 10 described above can also be incorporated or included in, or used with, the display surface 260 in accordance with various embodiments of the present disclosure.

The input device 270, for example the light pen, the optical or laser pointer, the stylus, or the game controller (e.g., handheld wireless game controller) is configured or adapted to provide an input, more specifically illumination (i.e., optical signals or light energy) to the display surface 260. Portions of the display surface 260 illuminate in response to receipt or capture of illumination supplied by the input device 270. The profile or pattern of display surface illumination is dependent, or corresponds to, movement profile or pattern of input device 270 relative to the display surface 260.

Aspects of Representative Processes for Manufacturing or Assembling a Mouse Pad 10

Figure 4:
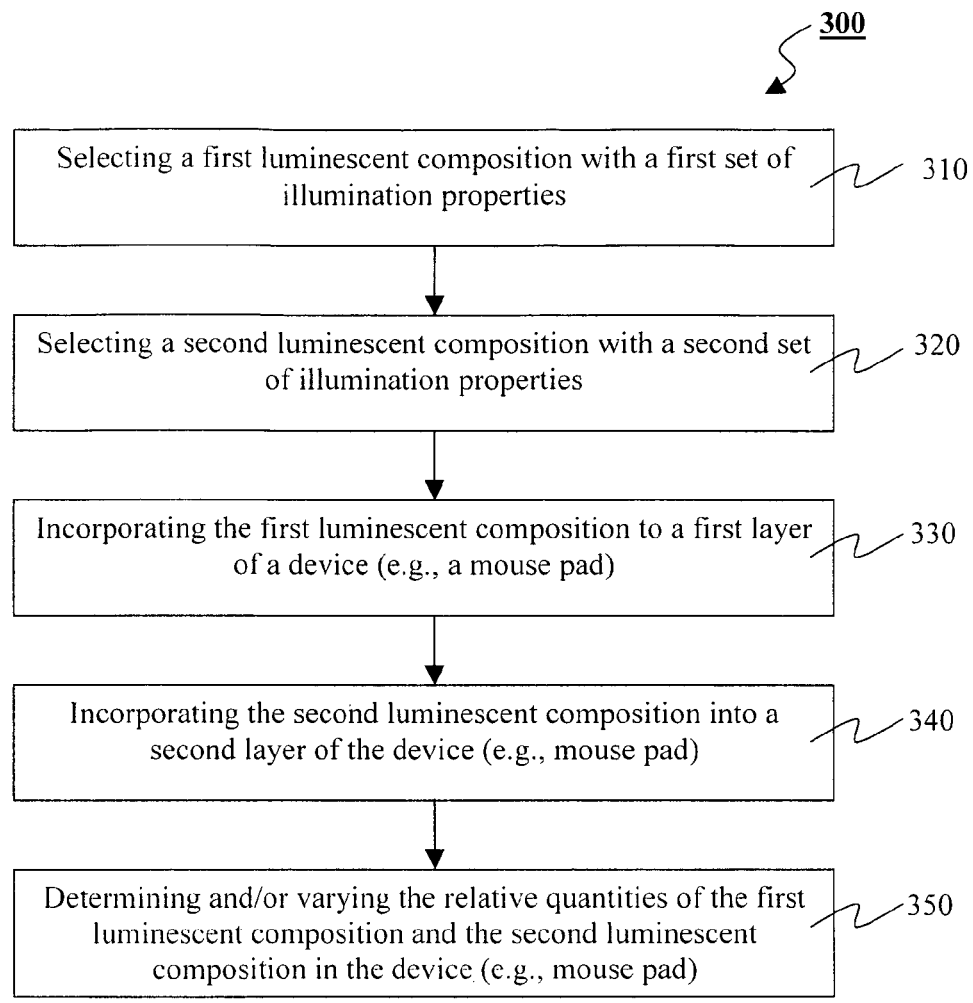
FIG. 4 is a flowchart of a process of manufacture, assembly, or production of a device, apparatus, or system, for example a mouse pad, according to particular embodiments of the present disclosure.

FIG. 4 is a flowchart of a process 300 for manufacturing, assembling, or producing the mouse pad 10 and/or an apparatus or device providing a surface that generates or emits optical signals in response to optical or other user input(s) according to particular embodiments of the present disclosure.

Although aspects of the following description are directed at processes for manufacturing, assembling, or producing mouse pads 10, it will be understood that the described processes can be modified, varied, adapted, and/or applied for manufacturing, assembling, or producing other systems, devices, or device surfaces (e.g., projection screens, touch-sensitive surfaces, support surfaces or substrates, and display surfaces or screens) within the scope of the present disclosure.

A first process portion 310 involves determining, selecting, choosing, and/or formulating the first luminescent composition. The first luminescent composition can be selected for, based upon, or based substantially upon, the first set of luminescent properties that is associated therewith.

As previously described, luminescent properties include: (a) exposure duration prior to becoming luminescent or adequately luminescent (or rate of light absorption); (b) color or wavelength of illumination or luminescence; (c) intensity or brightness of illumination or luminescence; (d) total illumination duration (or illumination persistence duration); and (e) rate of decay or disappearance of illumination or luminescence.

In particular embodiments, the first luminescent composition includes, or is, a blue glow in the dark powder, for instance an ultra blue glow in the dark powder manufactured by Glow Inc. The ultra blue glow in the dark powder has an illumination or glow color of aqua blue, a very high (or 9416) brightness rating, and a total illumination duration of approximately 9 hours. However, ultra blue glow in the dark powder requires a relatively long exposure duration prior to illuminating (i.e., has a relatively slow rate of light absorption).

A second process portion 320 involves determining, selecting, choosing, and/or formulating the second luminescent composition. The second composition is selected for, based upon, or based substantially upon, the second set of illumination properties that is associated therewith.

In particular embodiments, the second luminescent composition includes, or is, a green glow in the dark powder, for instance a regular green glow in the dark powder manufactured by Glow Inc. The regular green glow in the dark powder has a green or green-yellow glow or illumination color, a high brightness rating of 8703, and a total illumination duration of approximately 4 hours. In addition, the regular green glow in the dark powder requires a relatively short exposure duration prior to illuminating (i.e., has a relatively fast rate of light absorption).

The second luminescent composition (e.g., green glow in the dark powder such as the regular green glow in the dark powder) can have a faster rate of light absorption as compared to the first luminescent composition (e.g., blue glow in the dark powder such as the ultra-blue glow in the dark powder). In several embodiments, the second luminescent composition (e.g., green glow in the dark powder such as the regular green glow in the dark powder) has an at least approximately 10%, and more preferably at least approximately 25%, faster rate of light absorption as compared to the first luminescent composition (e.g., blue glow in the dark powder such as the ultra-blue glow in the dark powder). Accordingly, the inclusion of the second luminescent composition in the mouse pad 10 provides or establishes a faster rate of light absorption as compared to first luminescent composition.

In several embodiments, the first luminescent composition (e.g., blue glow in the dark powder such as the ultra-blue glow in the dark powder) has a longer illumination persistence duration as compared to the second luminescent composition (e.g., green glow in the dark powder such as the regular green glow in the dark powder). For example, the first luminescent composition can have an at least approximately 10% longer illumination persistence duration as compared to the second luminescent composition. In particular embodiments, the first luminescent composition has an at least approximately 25% longer illumination persistence duration as compared to the second luminescent composition.

The present disclosure discloses that the resultant set of luminescent properties associated with a device or apparatus, for instance the mouse pad 10, can be determined, established, modulated, influenced, and/or varied by way of including, incorporating, or using two or more different luminescent compositions in the device, for instance the mouse pad 10.

The present disclosure also discloses or teaches that a desired or target resultant set of illumination properties can be provided or established for the mouse pad 10 by way of selecting and incorporating at least two different luminescent compositions of appropriate sets of luminescent properties into the mouse pad 10, for instance at least two different layers of the mouse pad 10.

In multiple embodiments, at least one of the first and second luminescent compositions is selected in order to achieve a desired or target illumination persistence duration (or glow trail persistence duration) associated with the mouse pad 10. The desired or target mouse pad illumination persistence duration can be between approximately 1 and 15 seconds, and in selected embodiments between approximately 2 and 5 seconds.

In a third process portion 330, the first luminescent composition is included, added, or incorporated into, or associated with, the first layer 100 of the mouse pad 10. The first layer of the mouse pad 10 can be an upper surface or side of the mouse pad 10 that is proximal to the optical mouse 50 during normal operation of said mouse pad 10 and optical mouse 50.

In a fourth process portion 340, the second luminescent composition is included, added, or incorporated into, or associated with, the second layer 200 of the mouse pad 10. The second layer 200 of the mouse pad 10 can be positioned or disposed underneath the first layer 100 of the mouse pad 10 during normal operation or use of the mouse pad 10 and optical mouse 50.

The first layer 100 and the second layer 200 can be disposed next, adjacent, or proximal, to each other. Accordingly, in multiple embodiments of the present disclosure, the first luminescent composition and the second luminescent composition can be kept isolated or separated in different layers (e.g., the first layer 100 and the second layer 200) of the mouse pad 10.

Therefore, in multiple embodiments of the present disclosure, the mouse pad 10 includes multiple layers (or a multi-layered structure), for example two layers (or a bi-layered structure). It will be understood that mouse pads 10 including alternative numbers of layers, for example three, four, five, or more layers, each incorporating a different luminescent composition, are also included within the scope of the present disclosure.

A fifth process portion 350 involves or includes determining, selecting, adjusting, and/or varying the relative percentages or the ratio of the quantity of the first luminescent composition to the quantity of the second luminescent composition present in the mouse pad 10.

As described above, the resultant set of illumination properties of the mouse pad 10 is dependent upon the luminescent properties of the first luminescent composition associated with the first layer 100 as well as the luminescent properties of the second luminescent composition associated with the second layer 200. Each of the first luminescent composition and the second luminescent composition can be selected for providing or establishing a desired or target resultant set of illumination properties associated with the mouse pad 10. In addition, the ratio or relative quantity of the first luminescent composition to the second luminescent composition can be selected and/or varied to thereby provide or establish a desired or target resultant set of luminescent properties for the mouse pad 10.

Where the first luminescent composition and the second luminescent composition are associated with different illumination intensities, the ratio of the quantity of the first luminescent composition to the quantity of the second luminescent composition included in a mouse pad 10 can be selected and/or varied to thereby provide said mouse pad 10 with a desired or target illumination intensity.

In addition, where the first luminescent composition and the second luminescent composition are associated with different illumination persistence duration, the ratio of the quantity of the first luminescent composition to the quantity of the second luminescent composition included in a mouse pad 10 can be selected and/or varied to thereby provide said mouse pad 10 with a desired or target illumination persistence duration, for example between approximately 1 second and 15 seconds, or more specifically between approximately 2 seconds and 5 seconds.

Furthermore, where the first luminescent composition and the second luminescent composition are associated with different rates of light absorption the ratio of the quantity of the first luminescent composition to the quantity of the second luminescent composition included in a mouse pad 10 can be selected and/or varied to thereby provide said mouse pad 10 with a desired or target rate of light absorption, for example a rate of light absorption that effectuates an instantaneous, or substantially instantaneous, activation and hence emission of illumination.

In many embodiments of the present disclosure, the ratio of the quantity of the first luminescent composition to the quantity of the second luminescent composition of the mouse pad 10 is between approximately 4:1 and approximately 12:1. More specifically, in several embodiments, the ratio of the quantity of the first luminescent composition to the quantity of the second luminescent composition of the mouse pad 10 is between approximately 7:1 and approximately 10:1.

In several embodiments, the mouse pad 10 includes between 8-12 parts of the first luminescent composition to every one (i.e., each) part of the second luminescent composition. In particular embodiments, the mouse pad 10 includes approximately 10 parts of the first luminescent composition to every one (i.e., each) part of the second luminescent composition.

The process 300 for manufacturing or assembly the mouse pad 10 according to particular embodiments of the present disclosure facilitates or effectuates manufacture of mouse pads 10 that are capable of illumination based tracking of user motion. The mouse pads 10 manufactured by the process 300 are able to illuminate with an illumination profile corresponding to user-directed movement profile of an illumination source (e.g., the optical mouse 50 relative to the mouse pad 10). The mouse pad illumination is associated with a resultant set of illumination properties that is determined by the at least two different luminescent compositions (e.g., the first luminescent composition and the second luminescent composition) present, included, or incorporated into the mouse pad 10, for instance the at least two layers (e.g., the first layer 100 and the second layer 200) of the mouse pad 10. The resultant set of illumination properties of the mouse pad 10 can be selected and/or varied by varying the relative percentages of each of the at least two different luminescent compositions (e.g., the first luminescent composition and the second luminescent composition).

Although the process 300 is directed at manufacturing, assembling, or producing mouse pads 10, it will be understood that the process 300 can be adapted, modified, or varied for manufacturing, assembling, or producing analogous devices, or device surfaces and/or layers, for example display screens or surfaces and touch-sensitive surfaces such as touchpads and tablets, that include similar, or substantially similar, structural and/or functional characteristics or properties as compared to the mouse pad 10 described above within the scope of the present disclosure.

The process 300 can be adapted, modified, or varied for manufacturing, assembling, or producing analogous devices, or device surfaces and/or layers, that are capable of generating, outputting, or emitting optical signals that provide an intended or target set of illumination properties, and at a user-determined illumination profile or pattern, in response to receipt or capture of input provided by an input source (e.g., an input device or a portion of a user's body such as a finger). The input can be an optical input, a touch-based input, a proximity-based input, or a pressure-based input. The profile or pattern of illumination produced by said analogous devices, or device surfaces and/or layers, is dependent upon user-controlled or user-directed movement of the input source (e.g., input device) relative to said analogous devices, or device surfaces and/or layers.

Figure 5:
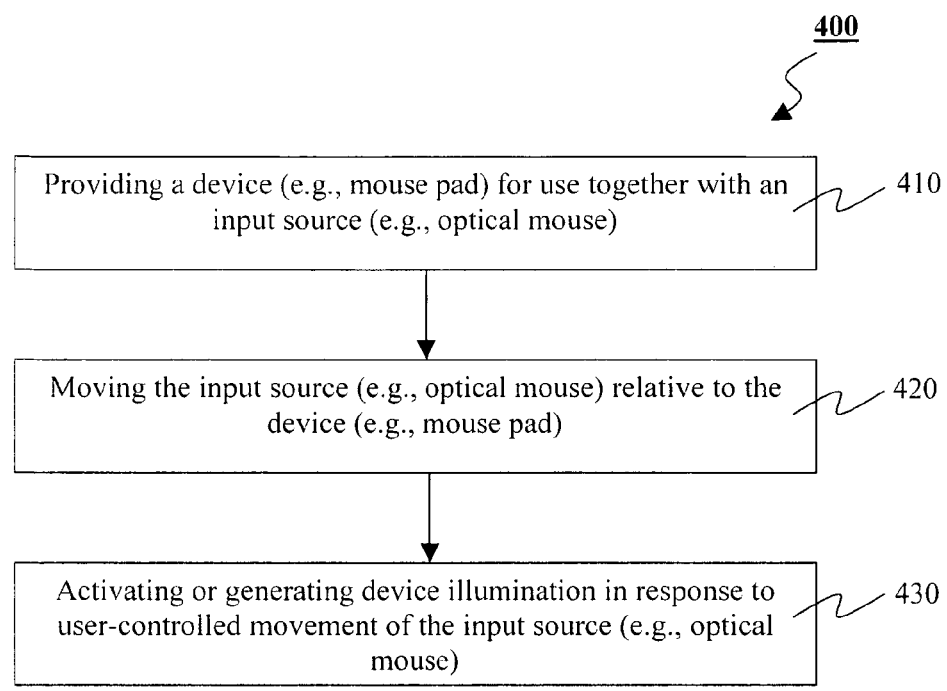
FIG. 5 is a flowchart of a process for generating user-motion dependent surface illumination according to particular embodiments of the present disclosure.

Aspects of Representative Processes for Generating or Producing Surface Illumination in Response to User Motion FIG. 5 is a flowchart of a process 400 for generating, producing, and/or displaying surface illumination, for instance mouse pad illumination, according to particular embodiments of the present disclosure.

In multiple embodiments of the present disclosure, the mouse pad illumination pattern, profile, shape, or direction is determined by user-motion or movement, more specifically the user-controlled or user-directed motion or movement of the optical mouse 50 relative to the mouse pad 10. The profile or pattern of mouse pad illumination can correspond to the movement profile or pattern of the optical mouse 50 relative to the mouse pad 10.

In a first process portion 410, the mouse pad 10 is provided for use with the optical mouse 50. The mouse pad 50 provides a substrate, support surface, or working surface for the operation of the optical mouse 50.

Aspects of the mouse pad 10 are described above. As described above, in most embodiments of the present disclosure, the mouse pad 10 includes the first luminescent composition that is associated with, or carried by, the first layer 100 and the second luminescent composition that is associated with, or carried by, the second layer 200. The first luminescent composition has the first set of luminescent properties and the second luminescent composition has the second set of luminescent properties.

The first luminescent composition and the second luminescent composition are selected for providing, generating, and/or establishing a desired resultant set of properties for the mouse pad 10. The relative percentages of the quantity of the first luminescent composition and the quantity of the second luminescent composition can also be selected and/or varied for selecting and/or varying the resultant set of illumination properties of the mouse pad 10.

In a second process portion 420, the optical mouse 50 is moved, translated, or displaced relative to the mouse pad 10.

As described above, the optical mouse 50 carries the illumination or light source (e.g., the LED). The illumination source (e.g., LED) is disposed or located at an underside of the optical mouse 50. More specifically, the illumination source (e.g., LED) is positioned to illuminate specific portions of the mouse pad 10 at or over which the optical mouse 50 is positioned, translated, or displaced.

Each of the first and second luminescent compositions is capable of absorbing light or light energy for subsequently emitting light or light energy. For instance, each of the first and second luminescent compositions is able to absorb light supplied by the optical mouse 50, more specifically the illumination source (e.g., LED) of the optical mouse 50, for subsequently emitting illumination (i.e., producing a glow trail).

In a third process portion 430, the mouse pad 10 produces, generates, or displays illumination or luminescence (also known as a glow trail) in response to, or in a manner that correlates with, user motion. In multiple embodiments, the profile or pattern of the mouse pad illumination is dependent upon (or corresponds to) user-controlled- or user-directed movement of the optical mouse 50 relative to the mouse pad 10.

Examples of different representative mouse pad illumination profiles, which correspond to user-directed optical mouse movement, are shown in FIG. 1a to FIG. 1 c. Accordingly, many embodiments of the present disclosure relate to illumination based user motion or movement tracking. Devices and apparatuses, more specifically surfaces such as mouse pads 10, of multiple embodiments of the present disclosure are able to track user motion relative thereto and produce, generate, and/or display illumination that is dependent upon said user motion relative thereto.

The resultant set of luminescent or illumination properties associated with the mouse pad, for example rate of light absorption, color or wavelength of illumination, brightness of illumination, illumination persistence duration, and/or rate of decay of illumination of the mouser pad, is dependent upon the properties, relative quantities, and/or distribution of at least two different luminescent compositions that are present, included, or incorporated into the mouse pad 10.

Particular examples (e.g., representative implementations) of specific embodiments of the present disclosure are described below. However, it will be understood that the scope of the present disclosure is not limited in any way by the examples described below. The examples provided are solely for aiding or enabling the reader to have a better understanding and/or appreciation of particular embodiments of the present disclosure.

Example One

In an embodiment of the present disclosure, a mouse pad including two layers, namely a first layer and a second layer, is provided.

The mouse pad has a relatively flat upper surface and is configured to support or carry an optical mouse. During normal, or typical, use or operation of the mouse pad, the first layer is disposed or positioned on top of the second layer. Hence, the first layer can be referred to as a top layer and the second layer can be referred to as a bottom layer. The first layer of the mouse pad can come into direct contact with the optical mouse. Alternatively, a protective coating can be provided or disposed on top of the first layer to thereby shield or protect the first layer from direct contact with environmental factors or agents (including direct contact with the optical mouse).

In a representative implementation corresponding to an embodiment described in example one, the first layer includes ultra blue glow in the dark powder and the second layer includes regular green glow in the dark powder, each of the ultra blue glow in the dark powder and the regular green glow in the dark powder being manufactured and obtained from Glow Inc.

The ultra blue glow in the dark powder has a very high brightness rating of 9416, a very long glow duration of up to approximately 9 hours, a glow color of aqua blue, a grade of 0, and an average particle size of between 35 micron and 65 micron. The green glow in the dark powder has a high brightness rating of 8703, a medium glow duration of up to approximately 4 hours, a glow color of green-yellow, a grade of 5, and an average particle size of between 15 microns to 40 microns. More specification details of each of the ultra blue glow in the dark powder and the green glow in the dark powder can be obtained from Glow Inc.

The time vs. brightness scale of each of the ultra blue glow in the dark powder and the regular green glow in the dark powder is provided in Table 1 below.

TABLE 1

Time vs. Brightness scale of ultra blue glow in the dark powder and regular green glow in the dark powder

| | Time | | | | | | | | | | |
|---|---|---|---|---|---|---|---|---|---|---|---|
| | 0 min | 0.5 min | 1 min | 2 min | 3 min | 4 min | 5 min | 6 min | 7 min | 8 min | 10 min |
| Ultra Blue Glow In The Dark Powder | 9416 | 3460 | 1700 | 1205 | 922 | 746 | 626 | 538 | 471 | 417 | 350 |
| Regular Green Glow In The Dark Powder | 1763 | 433 | 288 | 174 | 126 | 99 | 80 | 68 | 59 | 52 | 46 |

In example one, approximately 90% of ultra blue glow in the dark powder is added to or carried by the first layer of the mouse pad, and approximately 10% of regular green glow in the dark powder is added to or carried by the second layer of the mouse pad.

The presence of 90% ultra blue glow in the dark powder and 10% regular green glow in the dark powder in the first layer and second layer respectively of the mouse pad provides the mouse pad with a desired, intended, or target set of luminescent properties. The presence or inclusion of the 90% ultra blue glow in the dark powder carried by the first layer facilitates or effectuates the generation, production, and/or display of mouse pad illumination of a blue color. In addition, the presence or inclusion of the 90% ultra blue glow in the dark powder carried by the first layer facilitates or effectuates a faster (e.g., at least slightly faster or possibly significantly faster) rate of illumination decay for the mouse pad as compared to the rate of illumination decay of the regular green glow in the dark powder only. Furthermore, the presence or inclusion of the 90% ultra blue glow in the dark powder carried by the first layer facilitates or effectuates generation, production, and/or display of mouse pad illumination of higher (e.g., at least slightly higher or possibly significantly higher) intensity or brightness as compared to the intensity of the regular green glow in the dark powder when used alone.

Generally, ultra blue glow in the dark powder is associated with, or has, a relatively slow and/or long light absorption rate. Ultra blue glow in the dark powder has a slower and/or longer light absorption rate as compared to regular green glow in the dark powder. Accordingly, ultra blue glow in the dark powder requires a relatively longer exposure duration (i.e., needs to absorb light for a longer period of time) prior to generating, producing, and/or displaying illumination as compared to regular green glow in the dark powder.

Incorporating regular green glow in the dark powder into the second layer of the mouse pad enables the mouse pad illumination even when the duration of exposure to the light source is shorter than the duration required to activate the ultra blue glow in the dark powder (and thereby stimulate or generate illumination by the ultra blue glow in the dark powder). This is because the regular green glow in the powder, which is disposed at the second layer (i.e., located underneath the layer of ultra blue glow in the dark powder), is able to absorb light at a faster rate (i.e., has a faster rate of light absorption). Therefore, the regular green glow in the dark powder is able to start emitting light energy before the ultra blue glow in the dark powder.

The regular green glow in the dark powder can be activated by way of a short, or relatively short, exposure to the light source (e.g., optical mouse). The ultra blue glow in the dark powder can continue to absorb light emitted from the regular green glow in the dark powder subsequent the removal of the light source. The light energy emitted from (or supplied by) the regular green glow in the dark powder subsequent removal of the light source (i.e., in the absence of the light source) can be sufficient to activate the ultra blue glow in the dark powder and hence enabling the ultra blue glow in the dark powder to start illuminating (or emitting blue light).

In other words, the availability of light energy from the regular green glow in the dark powder, which is disposed at the adjacent or underlying second layer, provides the ultra blue glow in the dark powder with sufficient light energy subsequent the removal of the original light source to activate the ultra blue glow in the dark powder and cause the ultra blue glow in the dark powder to illuminate.

Therefore, the present disclosure discloses or teaches the ability to use a second luminescent composition (e.g., the regular green glow in the dark powder) with a first luminescent composition (e.g., the ultra blue glow in the dark powder) to enable the first luminescent composition to illuminate (i.e., activate the first luminescent composition) even when exposure duration to a light source (e.g., an LED carried by an optical mouse) is shorter than what is required (e.g., conventionally required) for activating the first luminescent composition.

The mouse pad with 10% regular green glow in the dark powder together with 90% ultra blue glow in the dark powder is able to illuminate with a blue illumination (by way of the blue glow in the dark powder) and after a shorter exposure duration to an illumination source (i.e., at a faster rate of light absorption) as compared to mouse pads with only ultra blue glow in the dark powder.

Should the mouse pad only include regular green glow in the dark powder, the mouse pad illumination will be of a green color, and at a brightness that is lower than that of the ultra blue glow in the dark powder. However, the use, inclusion, or incorporation of 90% ultra blue glow in the dark powder in the first layer of the mouse pad together with 10% regular green glow in the dark powder in the second layer of the mouse pad thereby enables the generation and/or display of mouse pad illumination of a blue color and at a relatively higher intensity brightness as compared to the regular green glow in the dark powder.

Embodiments of the present disclosure, for instance an embodiment as illustrated in Example one, discloses the ability to use, or to include, two different glow in the dark powders (e.g., a blue glow in the dark powder and a green glow in the dark powder) in a device such as a mouse pad, to thereby produce or generate a resultant set of illumination properties for mouse pad illumination, the resultant set of illumination properties being different from either of the two different glow in the dark powders. The presence, interaction, relationship, and/or relative position of the two different glow in the dark powders establishes a desired or target set of illumination properties for the mouse pad that may not be possible to establish or achieve when the mouse pad only includes one glow in the dark powder.

The present disclosure also discloses that it is possible to select and/or vary the relative percentages (or ratio) of the two different glow in the dark powders (e.g., a blue glow in the dark powder and a green glow in the dark powder) included or carried by a device such as a mouse pad to thereby select and/or vary the resultant set of illumination properties of the device. For instance, embodiments of the present disclosure (e.g., the embodiment of Example one) discloses that a desired or target illumination (or glow trail) persistence interval or duration can be achieved or established for a mouse pad by varying the relative quantities of two different luminescent compositions (e.g., ultra blue glow in the dark powder and regular green glow in the dark powder), wherein each luminescent composition has a different illumination persistence interval or duration.

The mouse pad of example one is able to illuminate depending upon user motion or movement relative to the mouse pad. The mouse pad of example one can illuminate with an illumination profile that is dependent upon user motion or movement relative to the mouse pad. More specifically, the mouse pad illumination profile corresponds to user-directed or user-controlled movement profile of the optical mouse relative to the mouse pad. Accordingly, the mouse pad of example one facilitates, effectuates, supports illumination based user motion tracking.

Example Two

A mouse pad including at least two layers, more specifically at least a first layer and a second layer, is provided by an embodiment of the present disclosure. The mouse pad has a relatively flat upper surface and is configured to be used as a support and operative substrate for an optical mouse. During normal, or typical, use or operation of the mouse pad, the first layer is disposed or positioned on top of the second layer.

The first layer includes a pure blue glow powder manufactured and sold by Glow Inc. The pure blue glow powder illuminates or glows at a sky blue color, and has a medium brightness rating of 3209 and a medium glow duration of 3 hours. Pure blue glow powder has a grade of 0 and an average particle size of 35 microns to 65 microns. The second layer includes an economy green glow powder that is manufactured and sold by Glow Inc. The economy green glow powder illuminates or glows with a green color. In addition, economy green glow powder is significantly cheap (e.g., approximately half the cost of regular green glow powder), has a fast light absorption rate, and a high brightness rating.

The time vs. brightness scale of the pore blue glow powder and the economy green glow powder is provided in Table 2 below.

TABLE 2

Time vs. Brightness Scale of Pure Blue Glow In The Dark Powder and Economy Green Glow In The Dark Powder

| Time | 0 min | 0.5 min | 1 min | 2 min | 3 min | 4 min | 5 min | 6 min | 7 min |
| --- | --- | --- | --- | --- | --- | --- | --- | --- | --- |
| Pure blue glow in the dark powder | 1870 | 740 | 534 | 357 | 272 | 221 | 186 | 160 | 141 |
| Economy green glow in the dark powder | 7055 | 1735 | 1154 | 698 | 507 | 396 | 323 | 275 | 238 |

In example two, approximately 80% of pure blue glow in the dark powder is added to or carried by the first layer of the mouse pad, and approximately 20% of the economy green glow in the dark powder is added to or carried by the second layer of the mouse pad.

The 80% pure blue glow in the dark powder carried by the first layer facilitates or effectuates the generation and/or display of blue mouse pad illumination of a blue color. In addition, the 80% pure blue glow in the dark powder carried by the first layer facilitates or effectuates a fast, or substantially fast, disappearance, fade, or decay of the blue mouse pad illumination. The inclusion of 80% pure blue glow in the dark powder in the first layer of the mouse pad enables the mouse pad to have a faster illumination decay rate as compared to the economy green glow in the dark powder. The inclusion of 80% pure blue glow in the dark powder and 20% of the economy green glow in the dark powder in the mouse pad can enable the glow trail displayed by the mouse pad of Example to disappear or fade at a desired or target rate (e.g., over a time period of between approximately 2 and 10 seconds).

Economy green glow in the dark powder has a higher initial brightness as compared to pure blue glow in the dark powder. Therefore, including or incorporating 20% economy green glow in the dark powder into the second layer of the mouse pad facilitates or effectuates establishment of resultant mouse pad illumination of a higher intensity or brightness rating as compared to pure blue glow in the dark powder.

In addition, including or incorporating 20% economy green glow in the dark powder into the second layer of the mouse pad can enable the mouse pad to become activated, and to illuminate or emit illumination, upon a shorter exposure duration to a light source.

The economy green glow in the dark powder has faster rate of light absorption as compared to the pure blue glow in the dark powder. The brief (e.g., significantly brief) exposure to a light source (e.g., a LED carried by an optical mouse) is not sufficient to activate the blue glow in the dark powder of the first layer of the mouse pad. However, because of the faster light absorption rate of the economy green glow in the dark powder, the economy green glow in the dark powder can be activated for emitting light upon, or subsequent, said brief exposure duration. Therefore, the economy green glow in the dark powder of the second layer can be activated, and hence emit light, upon the brief duration of exposure to the light source (e.g., a LED carried by an optical mouse). Light energy emitted from (or supplied by) the economy green glow in the dark powder of the second layer is absorbed by the pure blue glow in the dark powder of the first layer of the mouse pad, for example subsequent the brief exposure to the original light source, to thereby activate the blue glow in the dark powder and effectuate emission of blue illumination by the blue glow in the dark powder.

Therefore, the present disclosure discloses or teaches the use of a second glow in the dark powder (e.g., the economy green glow in the dark powder) to enable a first glow in the dark powder (e.g., the pure blue glow in the dark powder) to illuminate even when the duration of exposure to an illumination source is shorter than what is required (e.g., typically required) for activating the first glow in the dark powder. This is because the second glow in the dark powder, with a faster rate of light absorption, is capable of illuminating upon a shorter exposure duration to a light source (e.g., optical mouse), the light energy emitted from the second glow in the dark power being absorbed by the first glow in the dark powder to subsequently activate the first glow in the dark powder upon the removal of the original light source (e.g., the optical mouse).

As the economy green glow in the dark powder has a shorter illumination persistence duration as compared to the pure blue glow in the dark powder, the inclusion of the economy green glow in the dark powder (i.e., 20% economy green glow in the dark powder) can help to modulate, more specifically decrease or reduce, the illumination persistence duration of the mouse pad to a duration that is less than the illumination persistence duration of the Pure blue glow in the dark powder.

The mouse pad of example two is able to generate and/or display blue illumination depending upon user motion or movement relative to the mouse pad. The mouse pad of example two can illuminate with an illumination profile that is dependent upon or corresponds to user motion or movement relative to the mouse pad (e.g., user-controlled motion of an optical mouse relative to the mouse pad). Therefore, the mouse pad of example two facilitates, effectuates, supports illumination based user motion tracking.

While two examples of mouse pads provided by particular embodiments of the present disclosure are described above, it will be understood that other mouse pads including different luminescent compositions and/or a different number of layers (each including a different luminescent composition) are also included within the scope of the present disclosure. For example, particular embodiments of the present disclosure relate to mouse pads with four layers of luminescent compositions, namely a first layer of red glow in the dark powder, a second layer of orange glow in the dark powder, a third layer of blue glow in the dark powder, and a fourth layer of green glow in the dark powder. The multiple (e.g., four) layers of different colors of luminescent compositions can provide the mouse pad with a multi-colored illumination trail (or glow trail).

Embodiments of the present disclosure relate to illumination based user motion tracking devices, apparatuses, surfaces, methods, processes, and techniques. In most embodiments, the device, or device surface or layers, is configured to illuminate or emit light subsequent to receipt or capture of an input provided by an input source or input device. The input can be, or include, an optical input, touch-based input, a proximity-based input, and a pressure-based input. In many embodiments, the device, or device surface or layers, is configured to illuminate or emit light subsequent an exposure to a light or illumination source, for instance an optical mouse. In multiple embodiments, light or optical energy supplied or emitted by the illumination source is sufficient for effectuating generation and emission of light by the device, or device surface or layers. In many embodiments, device illumination (e.g., mouse pad illumination) is dependent upon user motion or movement. More specifically, pattern, profile, shape, or direction of device illumination (e.g., mouse pad illumination) corresponds to user-directed or user-controlled motion profile or pattern of the light source (e.g., optical mouse) relative to the device.

The device, or device surface, of multiple embodiments includes a multi-layered structure (e.g., at least a first layer and a second layer), each layer including or incorporating a different luminescent composition. Accordingly, the device, or device surface, of many embodiments can include at least two different luminescent compositions, each of the at least two different luminescent compositions having a different set of luminescent properties or characteristics and each of the at least two different luminescent compositions being disposed at, or carried by, different layers of the device or device surface.

In multiple embodiments, the device or device surface (e.g., mouse pad) includes two luminescent compositions, i.e., a first luminescent composition of a first set of luminescent properties and a second luminescent composition of a second set of luminescent properties. The first and second luminescent compositions can be selected and/or varied for providing the device with a desired, intended, or target set of luminescent or illumination properties (i.e., a resultant set of luminescent properties), wherein said resultant set of illumination properties is different from either of the first luminescent composition or the second luminescent composition.

The ratio or relative quantity of the first luminescent composition to the second luminescent composition of a device or the device surface (e.g., a mouse pad) can be selected and/or varied to thereby select and/or vary the set of resultant illumination properties of the device. For instance, where the first luminescent composition is ultra blue glow in the dark powder and the second luminescent composition is regular green glow in the art powder, increasing the relative percentage of the ultra blue glow in the dark powder to the regular green glow in the dark powder can increase the intensity or brightness of device illumination. Alternatively, by increasing the relative percentage of regular green glow in the dark powder to ultra blue glow in the dark powder, the light absorption rate and the illumination persistence duration of the device (e.g., mouse pad) can be correspondingly increased.

Embodiments of the present disclosure facilitate or effectuate establishing or providing a device (e.g., a mouse pad) with a desired, intended, or target set of luminescent properties by way of selecting at least two different luminescent compositions for incorporation or inclusion into the device and/or selecting the ratio or relative quantity of the at least two different luminescent compositions.

The ability to select, determine, vary, and/or adjust the resultant set of illumination properties or characteristics of the device (e.g., mouse pad) by way of selecting each of an at least two different luminescent compositions present, included, or incorporated in said device is novel, surprising, unexpected, and significantly advantageous. In addition, the ability to select and/or adjust the relative quantities of at least two different luminescent compositions included in a device (e.g., mouse pad) to thereby select and/or adjust the resultant set of illumination properties of the device (e.g., mouse pad) is novel, surprising, unexpected, and significantly advantageous.

Particular embodiments of the disclosure are described above for addressing at least one of the previously indicated problems. While features, functions, advantages, and alternatives associated with certain embodiments have been described within the context of those embodiments, other embodiments may also exhibit such advantages, and not all embodiments need necessarily exhibit such advantages to fall within the scope of the disclosure. For instance, any given layer of the mouse pad of the present disclosure can include luminescent liquid (e.g., a dye), crystalline composition, and/or other substance(s) or compositions(s). It will be appreciated that several of the above-disclosed structures, features and functions, or alternatives thereof, may be desirably combined into other different devices, systems, or applications. The above-disclosed structures, features and functions, or alternatives thereof, as well as various presently unforeseen or unanticipated alternatives, modifications, variations or improvements thereto that may be subsequently made by one of ordinary skill in the art, are encompassed by the following claims.

The invention claimed is:

1. A system comprising:
   a surface comprising:
      a first layer comprising a first luminescent composition of a first set of luminescent properties; and
      a second layer distinct from the first layer, the second layer comprising a second luminescent composition of a second set of luminescent properties, the first and second luminescent compositions providing the surface with a resultant set of luminescent properties,
   wherein portions of the surface are able to illuminate with the resultant set of luminescent properties,
   wherein a profile of the surface illumination corresponds to a motion profile of an input source relative to the surface;
   wherein the first layer is arranged over the second layer; and
   wherein the second layer is configured to activate the first luminescent composition to illuminate, by emitting light for receiving by the first layer.

2. The system as in claim 1, wherein the input source comprises one of an illumination source, a stylus, and a portion of a user's body.

3. The system as in claim 2, wherein the motion profile of the illumination source is one of controlled and determined by a user.

4. The system as in claim 3, wherein the surface is a mouse pad and the illumination source is carried by an optical mouse.

5. The system as in claim 4, wherein the profile of mouse pad illumination corresponds to user-directed motion profile of the optical mouse relative to the mouse pad.

6. The system as in claim 2, wherein the surface illumination is generated in response to light energy supplied by the illumination source.

7. The system as in claim 6, wherein light energy supplied by the illumination source is sufficient for generating surface illumination.

8. The system as in claim 2, wherein the first and second sets of luminescent properties of the first and second luminescent compositions are different from each other, and wherein the resultant set of luminescent properties of the device is different from either of the first and second set of luminescent properties.

9. The system as in claim 8, wherein a ratio of the first luminescent composition to the second luminescent composition is at least one of selectable and variable to thereby at least one of select and vary the resultant set of luminescent properties of the device.

10. The system as in claim 9, wherein the ratio of the quantity of the first luminescent composition to the second luminescent composition is between 4:1 and 12:1.

11. The system as in claim 9, wherein the ratio of the quantity of the first luminescent composition to the second luminescent composition is between 7:1 and 9:1.

12. The system as in claim 8, wherein the first luminescent composition has a higher brightness rating as compared to the second luminescent composition.

13. The system as in claim 12, wherein the brightness rating of the first luminescent composition is at least approximately 10% higher than the brightness rating of the second luminescent composition.

14. The system as in claim 12, wherein the brightness rating of the first luminescent composition is at least approximately 25% higher than the brightness rating of the second luminescent composition.

15. The system as in claim 8, wherein the first luminescent composition has a slower light absorption rating as compared to the second luminescent composition.

16. The system as in claim 15, wherein the light absorption rating of the first luminescent composition is at least approximately 10% slower than the light absorption rating of the second luminescent composition.

17. The system as in claim 15, wherein the light absorption rating of the first luminescent composition is at least approximately 25% slower than the light absorption rating of the second luminescent composition.

18. The system as in claim 8, wherein the first luminescent composition has a longer illumination persistence duration as compared to the second luminescent composition.

19. The system as in claim 18, wherein the illumination persistence duration of the first luminescent composition is at least approximately 10% longer than the illumination persistence duration of the second luminescent composition.

20. The system as in claim 1, wherein surface illumination is generated in response to one of touch-based input, a proximity-based input, and a pressure-based input provided by the input device.

* * * * *